(12) United States Patent
Nazarpoor (10) Patent No.: US 9,216,408 B2
(45) Date of Patent: Dec. 22, 2015

(54) SYSTEM AND METHOD FOR TWO AND THREE WAY MIXED METAL OXIDE ZPGM CATALYST

(71) Applicant: Zahra Nazarpoor, Camarillo, CA (US)

(72) Inventor: Zahra Nazarpoor, Camarillo, CA (US)

(73) Assignee: Clean Diesel Technologies, Inc., Oxnard, CA (US)

( * ) Notice: Subject to any disclaimer, the term of this patent is extended or adjusted under 35 U.S.C. 154(b) by 0 days.

(21) Appl. No.: 13/856,896

(22) Filed: Apr. 4, 2013

(65) Prior Publication Data

US 2014/0301931 A1    Oct. 9, 2014

(51) Int. Cl.

| | | |
|---|---|---|
| *B01J 21/00* | (2006.01) |
| *B01J 23/00* | (2006.01) |
| *B01J 23/02* | (2006.01) |
| *B01J 23/04* | (2006.01) |
| *B01J 23/08* | (2006.01) |
| *B01J 23/10* | (2006.01) |
| *B01J 23/32* | (2006.01) |
| *B01J 23/42* | (2006.01) |
| *B01J 23/44* | (2006.01) |
| *B01J 23/48* | (2006.01) |
| *B01J 23/56* | (2006.01) |
| *B01J 23/70* | (2006.01) |
| *B01J 23/74* | (2006.01) |
| *B01J 20/00* | (2006.01) |
| *B01J 23/83* | (2006.01) |
| *B01D 53/94* | (2006.01) |
| *B01J 37/02* | (2006.01) |
| *B01J 23/889* | (2006.01) |
| *B01J 35/00* | (2006.01) |

(52) U.S. Cl.
CPC ............... *B01J 23/83* (2013.01); *B01D 53/944* (2013.01); *B01D 53/945* (2013.01); *B01J 23/002* (2013.01); *B01J 23/8892* (2013.01); *B01J 35/002* (2013.01); *B01J 37/0244* (2013.01); *B01D 2255/209* (2013.01); *B01D 2255/2063* (2013.01); *B01D 2255/2065* (2013.01); *B01D 2255/2073* (2013.01); *B01D 2255/2094* (2013.01); *B01D 2255/20738* (2013.01); *B01D 2255/20746* (2013.01); *B01D 2255/402* (2013.01); *B01D 2255/9025* (2013.01); *B01J 2523/00* (2013.01)

(58) Field of Classification Search
USPC ......... 502/260–262, 302–304, 324, 326, 327, 502/332–334, 336, 338, 339, 349, 355, 415, 502/439, 527.12, 527.13
See application file for complete search history.

(56) References Cited

U.S. PATENT DOCUMENTS

| | | | |
|---|---|---|---|
| 4,673,556 A | 6/1987 | McCabe et al. | |
| 6,576,587 B2 | 6/2003 | Labarge et al. | |
| 6,624,113 B2 | 9/2003 | Labarge et al. | |
| 7,749,472 B2 * | 7/2010 | Chen et al. | 423/213.2 |
| 7,875,573 B2 | 1/2011 | Beutel et al. | |
| 8,080,494 B2 | 12/2011 | Yasuda et al. | |
| 8,148,295 B2 | 4/2012 | Augustine | |
| 8,858,903 B2 * | 10/2014 | Nazarpoor | 423/213.2 |
| 2009/0324468 A1 * | 12/2009 | Golden et al. | 423/210 |
| 2009/0324469 A1 | 12/2009 | Golden et al. | |
| 2009/0324470 A1 | 12/2009 | Alamdari et al. | |
| 2010/0152032 A1 * | 6/2010 | Galligan | 502/201 |
| 2010/0240525 A1 | 9/2010 | Golden et al. | |
| 2010/0266473 A1 | 10/2010 | Chen et al. | |
| 2012/0015801 A1 | 1/2012 | Deprez et al. | |
| 2014/0271390 A1 * | 9/2014 | Nazarpoor | 422/177 |
| 2014/0271391 A1 * | 9/2014 | Nazarpoor | 422/177 |

* cited by examiner

*Primary Examiner* — Cam N. Nguyen
(74) *Attorney, Agent, or Firm* — Barnes & Thornburg LLP; Edward F. Behm, Jr.; Thomas J. McWilliams (57) ABSTRACT

Disclosed here are material formulations of use in the conversion of exhaust gases, where the formulations may include Iron (Fe), Cobalt (Co), Manganese (Mn), Cerium (Ce), Lanthanum and combinations thereof.

7 Claims, 8 Drawing Sheets

SYSTEM AND METHOD FOR TWO AND THREE WAY MIXED METAL OXIDE ZPGM CATALYST

CROSS-REFERENCE TO RELATED APPLICATIONS

N/A

BACKGROUND

1. Technical Field

This disclosure relates generally to catalytic converters, and, more particularly, to materials of use in catalyst systems.

2. Background Information

Emissions standards seek the reduction of a variety of materials in exhaust gases, including unburned hydrocarbons (HC), carbon monoxide (CO), and nitrogen oxides (NO). In order to meet such standards, catalyst systems able to convert such materials present in the exhaust of any number of mechanisms are needed.

To this end, there is a continuing need to provide materials able to perform in a variety of environments, which may vary in a number ways, including oxygen content and the temperature of the gases undergoing treatment.

SUMMARY

Oxidation and three way ZPGM catalyst systems are disclosed. ZPGM catalyst systems may oxidize toxic gases, such as carbon monoxide and hydrocarbons; optionally some ZPGM catalytic converters may as well reduce nitrogen oxides that may be included in exhaust gases. ZPGM catalyst converters may include: a substrate, a washcoat, and an overcoat. Washcoat and overcoat may include at least one ZPGM catalyst, carrier material oxides and OSMs. Suitable known in the art chemical techniques, deposition methods and treatment systems may be employed in order to form the disclosed ZPGM catalyst converters.

Catalytic converters that include La—Ce—Mn—Fe—Co and La—Ce—Fe—Co may be suitable for use as Oxidation Catalysts at temperatures above 200° C.

Suitable materials for use as substrates may include refractive materials, ceramic materials, metallic alloys, foams, microporous materials, zeolites, cordierites, or combinations.

Carrier metal oxide materials of use in catalysts containing one or more of the aforementioned combinations may include Cerium Oxide, Alumina, Titanium Oxide, Zirconia and Ceria/Zirconia (CZO).

Suitable known in the art chemical techniques, deposition methods and treatment systems may be employed in order to form the disclosed ZPGM catalyst systems.

Numerous other aspects, features and advantages of the present disclosure may be made apparent from the following detailed description, taken together with the drawing figures.

BRIEF DESCRIPTION OF THE DRAWINGS

The present disclosure can be better understood by referring to the following figures. The components in the figures are not necessarily to scale, emphasis instead being placed upon illustrating the principles of the invention. In the figures, any reference numerals designate corresponding parts throughout different views.

DETAILED DESCRIPTION

Disclosed here are catalyst materials that may be of use in the conversion of exhaust gases, according to an embodiment.

The present disclosure is here described in detail with reference to embodiments illustrated in the drawings, which form a part hereof. In the drawings, which are not necessarily to scale or to proportion, similar symbols typically identify similar components, unless context dictates otherwise. Other embodiments may be used and/or other changes may be made without departing from the spirit or scope of the present disclosure. The illustrative embodiments described in the detailed description are not meant to be limiting of the subject matter presented herein.

DEFINITIONS

As used here, the following terms have the following definitions:

"Exhaust" refers to the discharge of gases, vapor, and fumes that may include hydrocarbons, nitrogen oxide, and/or carbon monoxide.

"R Value" refers to the number obtained by dividing the reducing potential by the oxidizing potential.

"Rich Exhaust" refers to exhaust with an R value above 1.

"Lean Exhaust" refers to exhaust with an R value below 1.

"Conversion" refers to the chemical alteration of at least one material into one or more other materials.

"Catalyst" refers to one or more materials that may be of use in the conversion of one or more other materials.

"Carrier material oxide" refers to support materials used for providing a surface for at least one catalyst.

"Oxygen Storage Material (OSM)" refers to a material able to take up oxygen from oxygen rich streams and able to release oxygen to oxygen deficient streams.

"Three Way Catalyst (TWC)" refers to a catalyst suitable for use in converting at least hydrocarbons, nitrogen oxide, and carbon monoxide.

"Oxidation Catalyst" refers to a catalyst suitable for use in converting at least hydrocarbons and carbon monoxide.

"Wash-coat" refers to at least one coating including at least one oxide solid that may be deposited on a substrate.

"Over-coat" refers to at least one coating that may be deposited on at least one wash-coat or impregnation layer.

"Zero Platinum Group (ZPGM) Catalyst" refers to a catalyst completely or substantially free of platinum group metals.

"Platinum Group Metals (PGMs)" refers to platinum, palladium, ruthenium, iridium, osmium, and rhodium.

DESCRIPTION OF THE DRAWINGS

Figure 1:
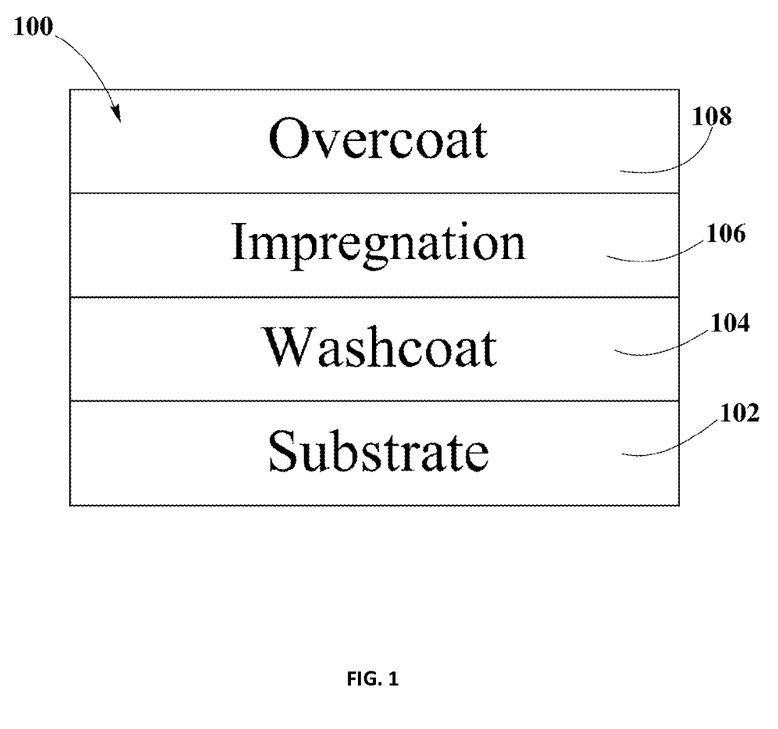
FIG. 1 shows a ZPGM catalyst system structure, according to an embodiment.

FIG. 1 depicts ZPGM catalyst system 100 configurations, according to various embodiments. As shown in FIG. 1A, ZPGM catalyst system 100 may include at least a Substrate 102 and a Washcoat 104, where Washcoat 104 may contain active two way or three way ZPGM catalyst components. ZPGM catalyst system 100 may optionally include an Impregnation 106 layer or an Overcoat 108 applied on over of Washcoat 104. Where Washcoat 104 or Impregnation 106 layer or Overcoat 108 may include active two way or three way ZPGM catalyst components.

According to an embodiment, Washcoat 104 or Impregnation 106 layer or Overcoat 108 may include at least one ZPGM transition metal catalyst, a ZPGM mixed metal catalyst, a ZPGM zeolite catalyst, or combinations thereof. A ZPGM transition metal catalyst may include one or more transition metals and/or least one rare earth metal, or a mixture; excluding platinum group metals.

Mixed Metal Oxide Catalyst

According to an embodiment, ZPGM catalyst system 100 may include a mixed metal oxide catalyst, which includes at least one transition metal and at least one other metal. The other metals of the mixed metal oxide may include, but are not limited to alkali and alkaline earth metal, lanthanides, or actinides. The mixed metal oxide may include a spinel, a perovskite, adelafossite, a lyonsite, a garnet, or a pyrochlore or combinations thereof.

According to an embodiment, ZPGM catalyst system 100 may include a mixed metal oxide catalyst that may include a perovskite having the formula $ABO_3$ or related structures. Partial substitution of the A site with M element will yield the general formula $A_{1-x}M_xBO_3$ and partial substitution of the B site will yield the general formula $AB_{1-x}M_xO_3$. "A" may include lanthanum, lanthanides, actinides, cerium, magnesium, calcium, barium, strontium, or mixtures thereof. "B" may include a single transition metal, or a mixture of transition metals and rare earth metals, including iron, manganese, silver, copper, nickel, cobalt, and cerium, or mixture thereof. M may include cerium, strontium, potassium, sodium, iron, and silver or mixtures thereof.

According to an embodiment, the mixed metal oxide catalyst may have the formula $AMn_{1-x}Cu_xO_3$, wherein "A" may be lanthanum, cerium, barium, strontium, a lanthanide, or an actinide and "x" may have values from 0 to 1.

According to another embodiment, a mixed metal oxide catalyst may have the formula $ACe_{1-x}Cu_xO3$, where "A" may be barium, strontium, or calcium, and "x" is 0 to 1. According to an embodiment, about 40 g/L to about 180 g/L of the formula $ABO3$ may be coupled with Substrate 102.

According to one embodiment, the ZPGM catalyst system 100 may include a perovskite ($ABO_3$) or related structure (with general formula $A_{1-x}M_xBO_3$ or $AB_{1-x}M_xO_3$) and one or more carrier material oxides. The perovskite or related structure may be present in about 5% to about 50% by weight.

According to an embodiment, a mixed metal oxide catalyst that may include a spinel structure having the formula $AB_2O_4$. "A" and "B" of the formula is aluminum, magnesium, manganese, gallium, nickel, copper, silver, cobalt, iron, chromium, titanium, tin, or mixtures thereof. According to an embodiment, mixed metal oxide catalyst that may include a spinel and a carrier material oxide. The spinel may be present in about 5% to about 50% by weight.

EXAMPLES

The following examples are divided in two groups. The first one includes ZPGM catalyst systems 100 of examples 1, 2 and 3; these catalyst systems include active metal in the form of perovskite that are added in Impregnation 106 solutions. The second group includes ZPGM catalyst systems 100 of examples 4, 5 and 6, which include the active metals in the form of perovskite in Overcoat 108.

In example 1, a ZPGM catalyst system 100 including a mixed metal oxide catalyst having a cordierite Substrate 102, a Washcoat 104 and impregnation is prepared. The Washcoat 104 includes at least a carrier metal oxide. The impregnation solution includes at least lanthanum, cerium, iron and cobalt. Lanthanum is present in about 10% to 30% by weight, cerium is present in about 6% to 20% by weight, iron is present in about 3% to 15% by weight and cobalt is present in about 5% to 10% by weight. To prepare the ZPGM catalyst system 100 of example 1 the liquid solution of cobalt salt iron salt is added to the mixture of lanthanum and cerium salts which were already dissolved in dionized water. Subsequently, citric acid is added with a molar ratio of total metal to citric acid of 1:1.5. The pH of mixture is adjusted to approximately neutral condition. The mixture of metal solution is impregnated to the substare already coated with Washcoat 104. The impregnated catalyst is heat treated, this treatment may be performed at about 700° C. The heat treatment may last from about 2 to about 6 hours. In an embodiment the treatment may last about 4 hours. The ZPGM catalyst system 100 of example 1 has a perovskite structure $(La_{0.8}Ce_{0.2})(Fe_{0.5}Co_{0.5})O_3$.

Figure 2:
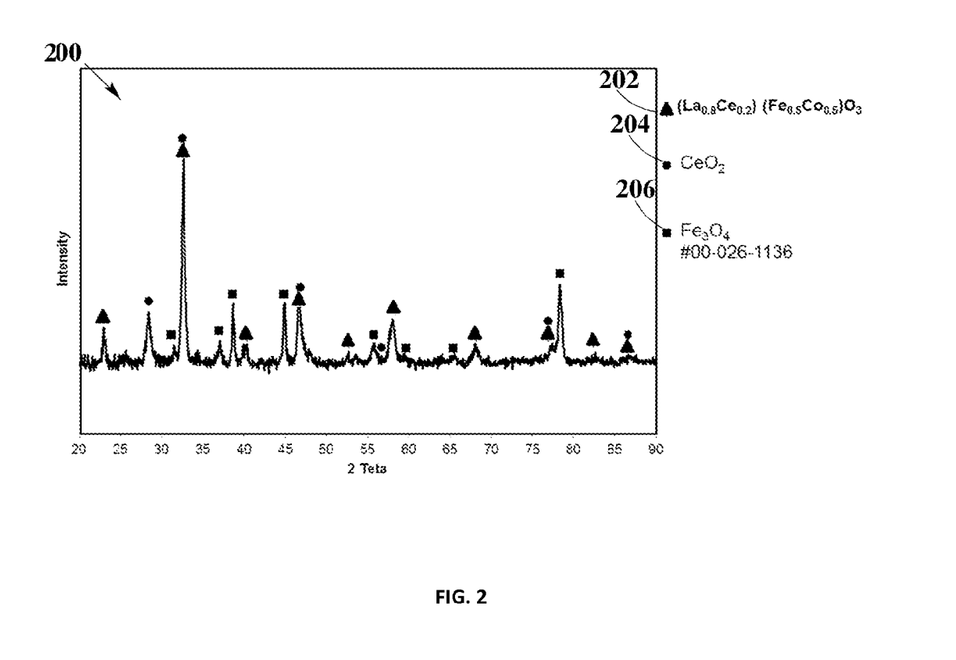
FIG. 2 shows the XRD spectra of a fresh sample of a ZPGM catalyst system, according to an embodiment.

FIG. 2 shows XRD spectrum 200 of a fresh sample of the ZPGM catalyst system 100 of example 1. As shown in XRD spectrum 200 there is a large formation of Perovskite structures 202 $(La_{0.8}Ce_{0.2})(Fe_{0.5}Co_{0.5})O_3$ (represented by triangles). The XRD spectrum 200 shows the presence of mixed oxide in addition to the perovskite, including Cerium oxide 204, $CeO_2$ (filed circles) and Iron oxide 206, $Fe_3O_4$ (filed squares).

In example 2, a ZPGM catalyst system 100 including a mixed metal oxide catalyst having a cordierite Substrate 102, a Washcoat 104 and impregnation is prepared. The Washcoat 104 includes at least a carrier metal oxide. The impregnation solution includes at least lanthanum, cerium, iron, manganese and cobalt. Lanthanum is present in about 10% to 30% by weight, cerium is present in about 6% to 20% by weight, iron is present in about 3% to 15% by weight, manganese is present about 4% to 10% by weight, and cobalt is present in about 5% to 10% by weight. To prepare the ZPGM catalyst system 100 of example 2 the liquid solution of cobalt salt iron salt is added to the mixture of lanthanum and cerium and manganese salts which were already dissolved in di-ionized water. Subsequently, citric acid is added with a molar ratio of total metal to citric acid of 1:1.5. The pH of mixture is adjusted to approximately neutral condition. The mixture of metal solution is impregnated to the Substrate 102 already coated with Washcoat 104. The impregnated catalyst is heat treated, this treatment may be performed at about 700° C. The heat treatment may last from about 2 to about 6 hours. In an embodiment the treatment may last about 4 hours. The catalyst of example 2 has a mixed phase perovskite and bixbyite structure of $La(Fe_{0.6}Co_{0.4})O_3$ and $FeMnO_3$.

Figure 3:
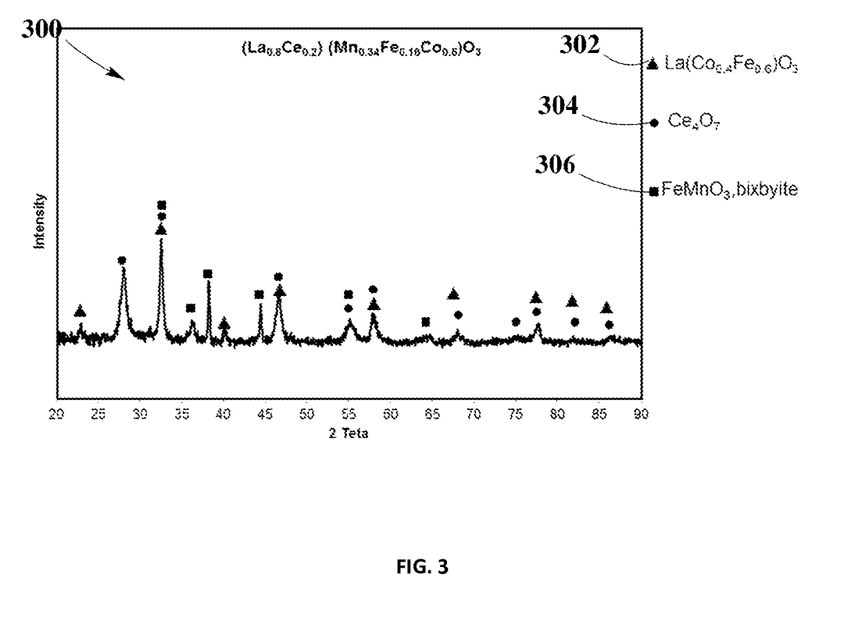
FIG. 3 shows the XRD spectra of a fresh sample of a ZPGM catalyst system, according to an embodiment.

FIG. 3 shows XRD spectra 300 of a fresh sample of the ZPGM catalyst system 100 of example 2. As shown in XRD spectra 300 there is a large formation of mixed phase perovstike and bixbyite structures. Perovskite structures 302 $La(Fe_{0.6}Co_{0.4})O_3$ are represented by triangles. Bixbyite structures 304 $FeMnO_3$ are represented by squares and Cerium oxide 306 $Ce_4O_7$ is represented by circles.

In example 3, a ZPGM catalyst system 100 including a mixed metal oxide catalyst having a cordierite Substrate 102, a Washcoat 104 and impregnation is prepared. The Washcoat 104 includes at least a carrier metal oxide. The impregnation solution includes at least iron and mangase. Iron is present in about 3% to 15% by weight and mangase is present in about 4% to 10% by weight. To prepare the ZPGM catalyst system 100 of example 3 the iron salt iron salt is added to manganese salt in dionized water. Subsequently, citric acid is added with a molar ratio of total metal to citric acid of 1:1.5. The pH of mixture is adjusted to approximately neutral condition. The mixture of metal solution is impregnated to the Substrate 102 already coated with Washcoat 104. The impregnated catalyst is heat treated, this treatment may be performed at about 700° C. The heat treatment may last from about 2 to about 6 hours. In an embodiment the treatment may last about 4 hours. The ZPGM catalyst system 100 of example 3 has a bixbyite structure $Mn_{1.4}Fe_{0.7}O_3$.

Figure 4:
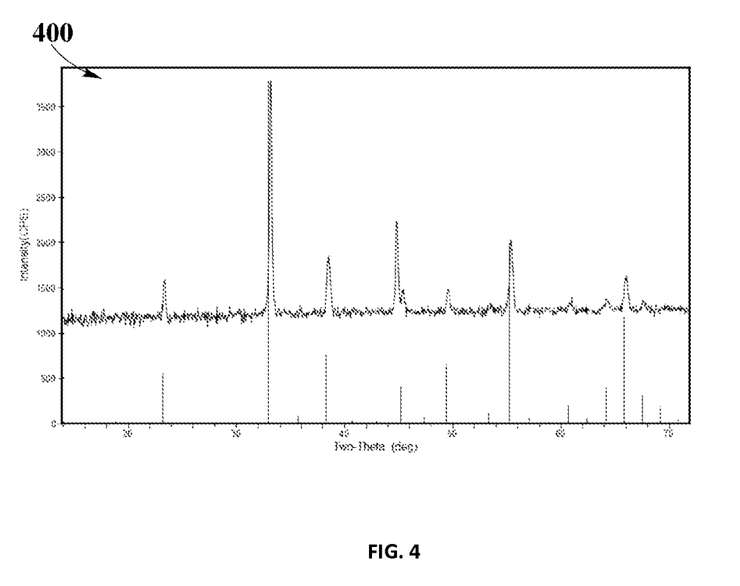
FIG. 4 shows the XRD spectra of a fresh sample of a ZPGM catalyst system, according to an embodiment.

FIG. 4 shows the XRD spectra 400 of a fresh sample of ZPGM catalyst system 100 of example 3. As shown in XRD spectra 400 there is a large formation of bixbyite structures $Mn_{1.4}Fe_{0.7}O_3$.

In example 4, a ZPGM catalyst system 100 including a mixed metal oxide catalyst having a cordierite Substrate 102, Washcoat 104 and Overcoat 108 is prepared. The Washcoat 104 includes at least a carrier metal oxide. The Overcoat 108 includes at least lanthanum, cerium, iron and cobalt, and a mixed metal oxide carrier such as zirconia and ceria. Lanthanum is present in about 10% to 30% by weight, cerium is present in about 6% to 20% by weight, iron is present in about 3% to 15% by weight and cobalt is present in about 5% to 10% by weight. To prepare the Overcoat 108, the liquid solution of cobalt salt and iron salt is added to the mixture of lanthanum and cerium salts which were already dissolved in di-ionized water. Subsequently, citric acid is added with a molar ratio of total metal to citric acid of 1:1.5. The mixture of metal solution precipitated to the mixed metal oxide carrier with a suitable compounds. subsequently, the Overcoat 108 slurry is coated to the Substrate 102 already coated with Washcoat 104. Overcoat 108 is heat treated at 700 C for 4 hrs. The ZPGM catalyst system 100 of example 32 has a perovskite structure $(La_{0.8}Ce_{0.2})(Fe_{0.5}Co_{0.5})O_3$.

Figure 5:
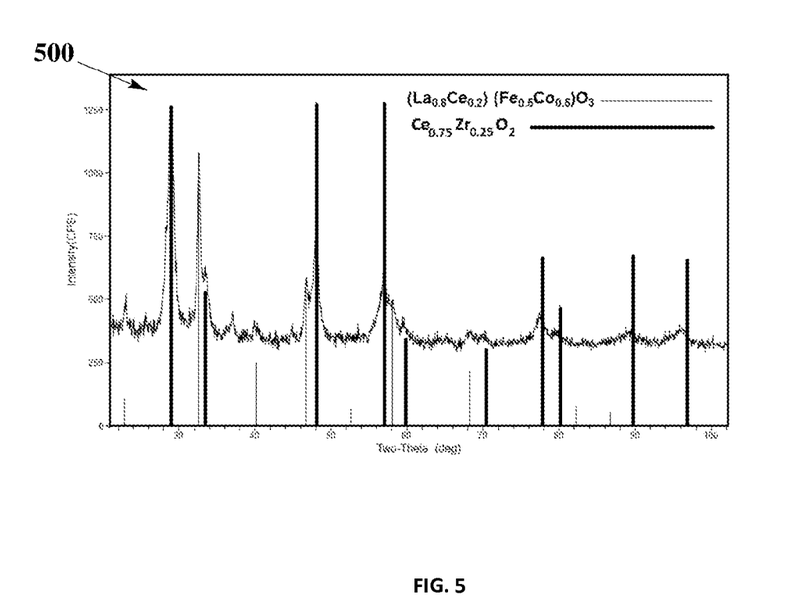
FIG. 5 shows the XRD spectra of a fresh sample of a ZPGM catalyst system, according to an embodiment.

FIG. 5 shows the XRD spectra 500 of a fresh sample of the catalyst of example 4. As shown in XRD spectra 500 there is a large formation of Cerium-Zirconium oxide structures $Ce_{0.75}Zr_{0.25}O_2$ and Lanthanum-Cobalt-Iron oxide structures $(La_{0.8}Ce_{0.2})(Fe_{0.5}Co_{0.5})O_3$.

In example 5, a ZPGM catalyst system 100 including a mixed metal oxide catalyst having a cordierite Substrate 102, Washcoat 104 and Overcoat 108 is prepared. The Washcoat 104 includes at least a carrier metal oxide. The Overcoat 108 includes at least lanthanum, cerium, iron and cobalt, manganese and a mixed metal oxide carrier such as zirconia and ceria. Lanthanum is present in about 10% to 30% by weight, cerium is present in about 6% to 20% by weight, iron is present in about 3% to 15% by weight, manganese is present in about 4% to 10% by weight and cobalt is present in about 5% to 10% by weight. To prepare the Overcoat 108, the liquid solution of cobalt salt and iron salt is added to the mixture of manganese, lanthanum and cerium salts which were already dissolved in di-ionized water. Subsequently, citric acid is added with a molar ratio of total metal to citric acid of 1:1.5. The mixture of metal solution precipitated to the mixed metal oxide carrier with a suitable compounds. Subsequently, the Overcoat 108 slurry is coated to the Substrate 102 already coated with Washcoat 104. Overcoat 108 is heat treated at 700 C for 4 hr. The ZPGM catalyst system 100 of example 33 has a mixed phase perovskite and bixbyite structure of $La(Fe_{0.6}Co_{0.4})O_3$ and $FeMnO_3$.

In example 6, a ZPGM catalyst system 100 including a mixed metal oxide catalyst having a cordierite Substrate 102, a Washcoat 104 and Overcoat 108 is prepared. The Washcoat 104 includes at least a carrier metal oxide. The Overcoat 108 includes at least lanthanum, cerium, iron and cobalt, manganese and a metal oxide carrier like Lanthanum doped Alumina. Lanthanum is present in about 10% to 30% by weight, cerium is present in about 6% to 20% by weight, iron is present in about 3% to 15% by weight, manganese is present in about 4% to 10% by weight and cobalt is present in about 5% to 10% by weight. To prepare the Overcoat 108, the liquid solution of cobalt salt and iron salt is added to the mixture of manganese, lanthanum and cerium salts which were already dissolved in di-ionized water. Subsequently, citric acid is added with a molar ratio of total metal to citric acid of 1:1.5. The mixture of metal solution precipitated to the mixed metal oxide carrier with a suitable compounds. subsequently, the Overcoat 108 slurry is coated to the Substrate 102 already coated with Washcoat 104. Overcoat 108 is heat treated at 700 C for 4 hr. The ZPGM catalyst system 100 of example 33 has a mixed phase perovskite and bixbyite structure of $La(Fe_{0.6}Co_{0.4})O_3$ and $FeMnO_3$.

Figure 6:
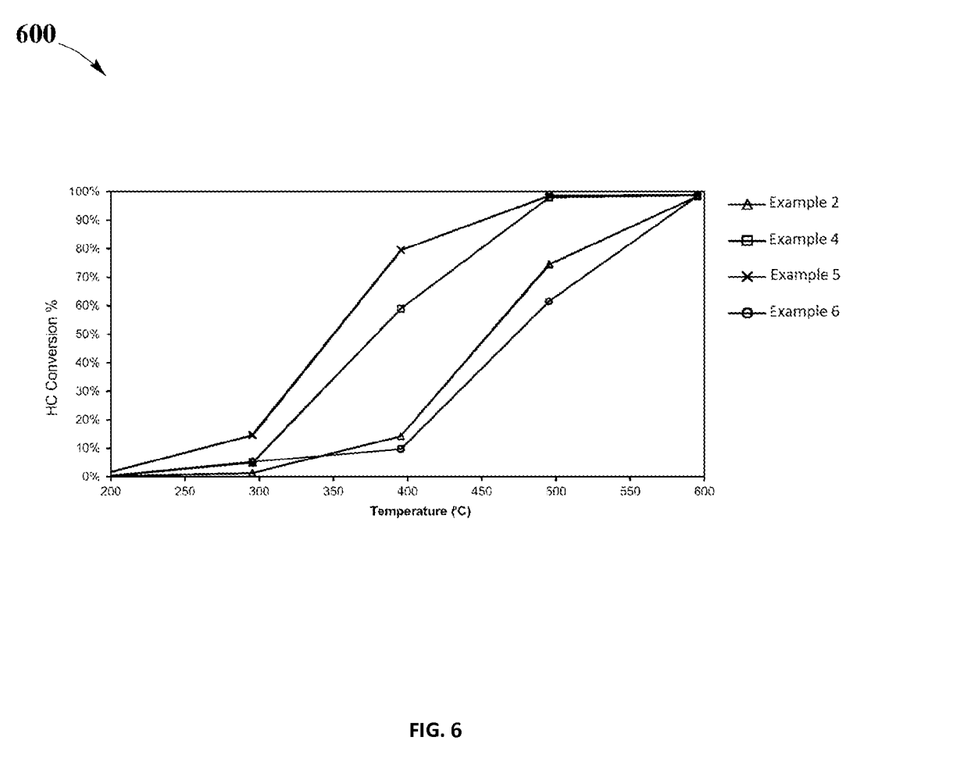
FIG. 6 shows light-off test results of ZPGM catalysts, according to an embodiment.

FIG. 6 shows Light-off test results 600 for the ZPGM catalyst systems 100 of examples 2, 4, 5 and 6. Hydrocarbons conversion is measured as a function of the ZPGM catalyst system 100 temperature. The hydrocarbon present in the feed stream is propene (C3H6). Since the light-off test is performed under lean condition (R-values<1), no nitrogen oxide conversion is measured. The test is performed by increasing the temperature from about 200° C. to 600° C. at a constant rate of 40° C./min. The light-off test at R=0.316 shows that the ZPGM catalyst system 100 of example 5 with $La(Fe_{0.6}Co_{0.4})O_3$ and $FeMnO_3$ mixed phase on Cerium-Zirconium oxide carrier in Overcoat 108 has significantly higher HC conversion that ZPGM catalyst system 100 of example 6 with the same structure but alumina carrier and ZPGM catalyst system 100 of example 2 with the same structure but in impregnation layer.

Figure 7:
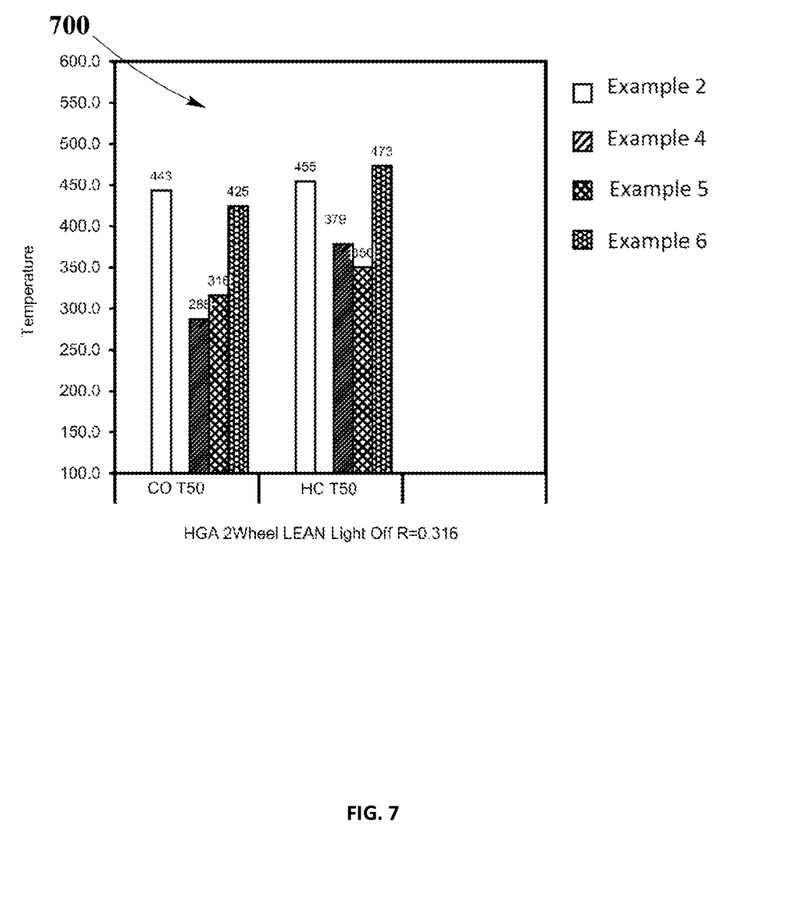
FIG. 7 is a comparative bar graph of ZPGM catalyst systems performance, according to an embodiment.

FIG. 7 shows Bar graph 700, which compares the T50s for HC and CO of the ZPGM catalyst systems 100 of examples 2, 4, 5 and 6. These were measured during light-off tests performed under lean exhaust gas conditions, R=0.316. Carbon monoxide, and hydrocarbons conversion are measured as a function of the ZPGM catalyst system 100 temperature. The hydrocarbon present in the feed stream is propene (C3H6). Since the light-off test is performed under lean condition (R-values<1), no nitrogen oxide conversion is measured. The test is performed by increasing the temperature from about 200° C. to 600° C. at a constant rate of 40° C./min. The ZPGM catalyst system 100 of example 5 and example 4 have the highest activity for HC conversion, as shown by lowest HC T50 at 350° C. and 379° C., respectively and the highest activity for CO conversion, as shown by lowest CO T50 at 316° C. and 288° C., respectively.

Figure 8:
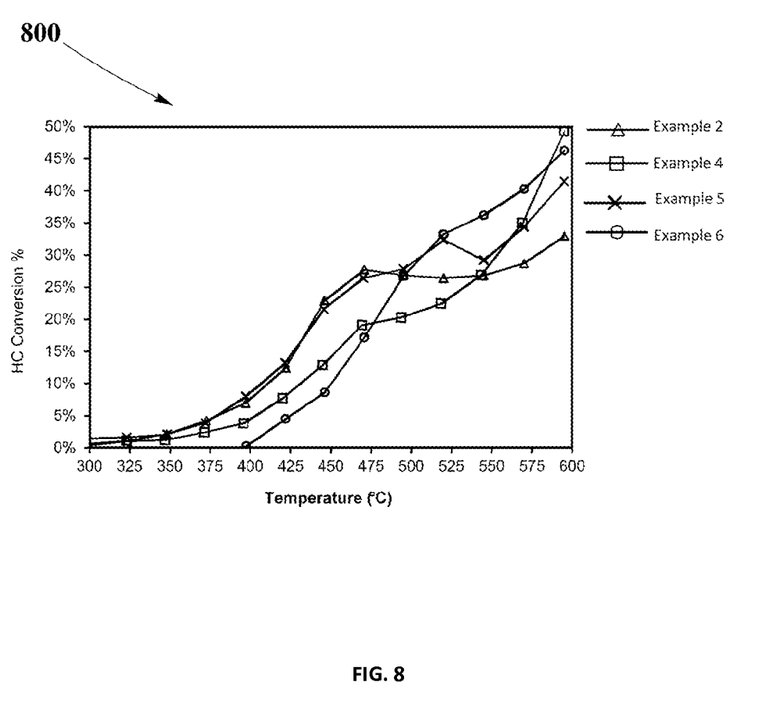
FIG. 8 shows light-off test results of ZPGM catalysts, according to an embodiment.

FIG. 8 shows Light-off test results 800 for the ZPGM catalyst systems 100 of examples 2, 4, 5 and 6. Hydrocarbons conversion is measured as a function of the ZPGM catalyst system 100 temperature. The hydrocarbon present in the feed stream is propene (C3H6). The light-off test is performed under rich condition (R-values>1). The test is performed by increasing the temperature from about 300° C. to 600° C. at a constant rate of 40° C./min. The light-off test at R=1.224 shows that the ZPGM catalyst system 100 of examples 2 and 5 have similar behavior under rich condition. ZPGM catalyst system 100 shows improvement in HC conversion at high range of temperature (above 500 C).

I claim:

1. A catalyst system, comprising:
   a substrate;
   a washcoat deposited on the substrate, comprising a first zero platinum group metal (ZPGM) catalyst; and
   an overcoat deposited on the substrate, comprising at least one overcoat oxide solid selected from the group consisting of at least one of a carrier material oxide, and a second ZPGM catalyst;
   wherein metal in the first ZPGM catalyst consists of lanthanum, cerium, iron, and cobalt.

2. A zero platinum group metal (ZPGM) catalyst system, comprising:
   a substrate; and
   a washcoat deposited on the substrate, comprising a ZPGM catalyst;
   wherein the ZPGM catalyst comprises at least one perovskite structured compound having the formula $(La_{1-x}Ce_x)(Fe_{1-y}Co_y)O_3$, wherein x is 0 to 0.2, and wherein y is 0.4 to 0.5.

3. A catalyst system, comprising:
   a substrate;
   a washcoat deposited on the substrate;
   an impregnation layer comprising a zero platinum group metal (ZPGM) catalyst; and
   an overcoat deposited on the substrate;
   wherein the ZPGM catalyst comprises about 10% to about 30% by weight lanthanum, about 6% to about 20% by weight cerium, about 3% to about 15% by weight iron, and about 5% to about 10% by weight cobalt.

4. The catalyst system of claim 3 wherein the impregnation layer is impregnated in the washcoat.

5. The catalyst system of claim 4 wherein the ZPGM catalyst further comprises about 4% to about 10% by weight manganese.

6. The catalyst system of claim 3 wherein the impregnation layer is impregnated in the overcoat.

7. The catalyst system of claim 6 wherein the ZPGM catalyst further comprises about 4% to about 10% by weight manganese.

* * * * *